United States Patent
Abe et al.

(10) Patent No.: US 9,475,934 B2
(45) Date of Patent: Oct. 25, 2016

(54) POLYESTER RESIN COMPOSITION AND MOLDED ARTICLE CONTAINING THIS RESIN COMPOSITION

(71) Applicants: KANEKA CORPORATION, Osaka-shi (JP); RIKEN, Wako-shi (JP)

(72) Inventors: Hideki Abe, Saitama (JP); Noriyuki Suzuki, Osaka (JP); Tetsuya Minami, Osaka (JP); Nobuo Nakamura, Osaka (JP)

(73) Assignees: KANEKA CORPORATION, Osaka-shi (JP); RIKEN, Wako-shi (JP)

( * ) Notice: Subject to any disclaimer, the term of this patent is extended or adjusted under 35 U.S.C. 154(b) by 0 days.

(21) Appl. No.: 14/419,414

(22) PCT Filed: Jul. 11, 2013

(86) PCT No.: PCT/JP2013/004286
§ 371 (c)(1),
(2) Date: Feb. 3, 2015

(87) PCT Pub. No.: WO2014/020838
PCT Pub. Date: Feb. 6, 2014

(65) Prior Publication Data
US 2015/0210801 A1    Jul. 30, 2015

(30) Foreign Application Priority Data

Aug. 3, 2012 (JP) .................................. 2012-172812

(51) Int. Cl.
| | | |
|---|---|---|
| C08L 67/04 | (2006.01) | |
| C08K 5/053 | (2006.01) | |
| C08G 63/06 | (2006.01) | |
| C08G 63/08 | (2006.01) | |

(52) U.S. Cl.
CPC .............. *C08L 67/04* (2013.01); *C08G 63/06* (2013.01); *C08G 63/08* (2013.01); *C08K 5/053* (2013.01)

(58) Field of Classification Search
CPC ....... C08G 63/06; C08G 63/08; C08L 67/04; C08K 5/053
See application file for complete search history.

(56) References Cited

U.S. PATENT DOCUMENTS 6,127,512 A * 10/2000 Asrar et al. .................. 528/272
2006/0105440 A1 * 5/2006 Kinoshita et al. ............ 435/135

FOREIGN PATENT DOCUMENTS

| JP | 06-299054 A | 10/1994 |
|---|---|---|
| JP | 08-027363 A | 1/1996 |
| JP | 09-501450 A | 2/1997 |
| JP | 09-278991 A | 10/1997 |
| JP | 10-158369 A | 6/1998 |
| JP | 11-005849 A | 1/1999 |
| JP | 11-116783 A | 4/1999 |
| JP | 2000-169546 A | 6/2000 |
| JP | 2001-192442 A | 7/2001 |
| JP | 2003-517126 A | 7/2003 |
| JP | 2003-238779 A | 8/2003 |
| JP | 2003-327803 A | 11/2003 |
| JP | 2006-117736 A | 5/2006 |
| JP | 2007-077232 A | 3/2007 |
| JP | 2007-517126 A | 6/2007 |
| JP | 2007-231184 * | 9/2007 |
| JP | 2007-231184 A | 9/2007 |
| JP | 2008-156665 A | 7/2008 |
| JP | 2009-024058 A | 2/2009 |
| JP | 2010-229407 A | 10/2010 |
| WO | WO 94/28061 A1 | 12/1994 |
| WO | WO 2005/066256 A1 | 7/2005 |
| WO | WO 2008/099586 A1 | 8/2008 |

OTHER PUBLICATIONS

International Search Report issued Oct. 15, 2013 in PCT/JP2013/004286 Filed Jul. 11, 2013.
U.S. Appl. No. 14/439,512, filed Apr. 29, 2015, Suzuki, et al.
U.S. Appl. No. 14/435,297, filed Apr. 13, 2015, Suzuki, et al.
Combined Office Action and Search Report issued Oct. 27, 2015 in Chinese Patent Application No. 201380040683.7 (with partial English language translation).
E. Grillo Fernandes, et al., "Thermo-Mechanical and Morphological Characterization of Plasticized Poly[(R)-3-hydroxybutyric acid]" Macromolecular Symposia, vol. 218, 2004, pp. 157-164.
U.S. Appl. No. 14/767,144, filed Aug. 11, 2015, Minami, et al.

* cited by examiner

*Primary Examiner* — Robert Jones, Jr.
(74) *Attorney, Agent, or Firm* — Oblon, McClelland, Maier & Neustadt, L.L.P.

(57) ABSTRACT

An object is to increase crystallization speed, which is a drawback of polyhydroxyalkanoate, to improve processability in processing such as injection molding or blow molding and increase the speed of processing and is, in addition, to refine the crystal of polyhydroxyalkanoate to suppress a change of mechanical properties with passage of time of a resulting molded article. Disclosed herein is a polyester resin composition containing polyhydroxyalkanoate and pentaerythritol.

20 Claims, No Drawings

POLYESTER RESIN COMPOSITION AND MOLDED ARTICLE CONTAINING THIS RESIN COMPOSITION

TECHNICAL FIELD

The present invention relates to a polyester resin composition, more particularly relates to a polyester resin composition for allowing a biodegradable polyester resin, which is decomposed by the action of microorganisms, to be used as various industrial materials, and a molded article containing such a polyester resin composition.

BACKGROUND ART

Large amounts of petroleum-based plastics are discarded every year, and therefore serious problems caused by such large amounts of waste, such as shortage of landfills and environment pollution, have been reported. Under the circumstances, biodegradable plastics have received attention which are decomposed by the action of microorganisms in the environment, landfills, or compost. Biodegradable plastics are under development with the aim of expanding their application to materials for use in the environment in agriculture, forestry, and fisheries, and also to food containers, package materials, sanitary materials, and garbage bags, which are difficult to recover/recycle after use.

Among them, from the viewpoint of reducing carbon dioxide emissions or fixing carbon dioxide (carbon neutral), polyhydroxyalkanoate (hereinafter, sometimes abbreviated as "PHA") that is a plant-derived aliphatic polyester is receiving attention.

However, such polyhydroxyalkanoate has a slow crystallization speed, and therefore its molding processing requires a long cooling time for solidification after heat-melting, which causes problems such as poor productivity and change in mechanical properties with passage of time (especially, toughness such as tensile elongation at break) due to secondary crystallization that occurs after molding.

In order to solve such problems, addition of an inorganic substance such as boron nitride, titanium oxide, talc, lamellar silicate, calcium carbonate, sodium chloride, or metal phosphate to polyhydroxyalkanoate has heretofore been proposed to promote crystallization. However, addition of such an inorganic substance has many negative effects such as reduction in the tensile elongation of a resulting molded article, poor appearance of the surface of the molded article, and poor transparency of a resulting film, and therefore its effect is inadequate.

Other methods have been proposed to promote the crystallization of polyhydroxyalkanoate without using an inorganic substance. Examples of such methods include: one in which a natural product-derived sugar alcohol compound such as erythritol, galactitol, mannitol, or arabitol is added (Patent Document 1); one in which polyvinyl alcohol, chitin, or chitosan is added (Patent Document 2); one in which polyethylene oxide is added (Patent Document 3); one in which an aliphatic carboxylic amide, an aliphatic carboxylate, an aliphatic alcohol, or an aliphatic carboxylic acid ester is added (Patent Documents 4, 5, and 13); one in which a dicarboxylic acid derivative such as dimethyl adipate, dibutyl adipate, diisodecyl adipate, or dibutyl sebacate is added (Patent Document 6); one in which a cyclic compound having C=O and a functional group selected from NH, S, and O in its molecule, such as indigo, quinacridone, or quinacridone magenta, is added (Patent Document 7); one in which a sorbitol-based derivative such as bis-benzylidene sorbitol or bis(p-methylbenzylidene)sorbitol is added (Patent Document 8); one in which a cyclic compound having C=O and an NH group in its molecule is added (Patent Document 9); one in which a compound containing a nitrogen-containing heteroaromatic nucleus, such as pyridine, triazine, or imidazole, is added (Patent Document 10); one in which a phosphate compound is added (Patent Document 11); one in which a bisamide of higher fatty acid and a metal salt of higher fatty acid are added (Patent Document 12); and one in which branched polylactic acid is added (Patent Document 14). However, the fact is that a practically effective crystal nucleating agent has not yet been found.

CITATION LIST

Patent Documents

Patent Document 1: WO 2008/099586
Patent Document 2: JP-A-2007-077232
Patent Document 3: JP-A-2010-229407
Patent Document 4: JP-A-9-278991
Patent Document 5: JP-A-11-005849
Patent Document 6: JP-A-11-116783
Patent Document 7: JP-A-2003-238779
Patent Document 8: JP-A-10-158369
Patent Document 9: JP-A-2003-327803
Patent Document 10: JP-T-2007-517126
Patent Document 11: JP-A-2003-192884
Patent Document 12: JP-A-6-299054
Patent Document 13: JP-A-8-27363
Patent Document 14: JP-A-2009-024058

DISCLOSURE OF THE INVENTION

Problems to be Solved by the Invention

It is an object of the present invention to improve the slowness of crystallization that is a drawback of a biodegradable polyester, especially polyhydroxyalkanoate, decomposed into water and carbon dioxide by the action of microorganisms, to improve crystallization/solidification properties during molding processing such as injection molding or blow molding and increase the speed of processing, and it is also an object of the present invention to refine the crystal of polyhydroxyalkanoate to suppress a change in the mechanical properties with passage of time of a resulting molded article.

Means for Solving the Problems

The present inventors have intensively studied to find a crystal nucleating agent effective for polyhydroxyalkanoate slow in crystallization, and as a result have found that the crystallization speed of polyhydroxyalkanoate can be significantly improved by mixing with pentaerythritol as a crystal nucleating agent, which has led to the completion of the present invention.

Specifically, the present invention relates to a polyester resin composition containing polyhydroxyalkanoate (hereinafter, abbreviated as "PHA") and pentaerythritol.

It is to be noted that in the present invention, the crystal nucleating agent refers to one that acts as a nucleus for crystallization of an aliphatic polyester-based polymer such as a homopolymer or copolymer of PHA.

Specifically, a first aspect of the present invention relates to a polyester resin composition containing polyhydroxyalkanoate and pentaerythritol.

A preferred embodiment of the first aspect of the present invention relates to the polyester resin composition wherein an amount of the pentaerythritol is 0.05 to 12 parts by weight with respect to 100 parts by weight of the polyhydroxyalkanoate.

A more preferred embodiment of the first aspect of the present invention relates to the polyester resin composition wherein the polyhydroxyalkanoate includes a repeating unit represented by the following general formula (1):

$$[-CHR-CH_2-CO-O-] \quad (1)$$

wherein R is an alkyl group represented by $C_nH_{2n+1}$ and n is an integer of 1 or more and 15 or less.

An even more preferred embodiment of the first aspect of the present invention relates to the polyester resin composition wherein the polyhydroxyalkanoate is at least one selected from poly-3-hydroxybutyric acid, poly(3-hydroxybutyric acid-co-3-hydroxyvaleric acid), poly(3-hydroxybutyric acid-co-3-hydroxyvaleric acid-co-3-hydroxyhexanoic acid, poly(3-hydroxybutyric acid-co-3-hydroxyhexanoic acid), and poly(3-hydroxybutyric acid-co-4-hydroxybutyric acid).

A second aspect of the present invention relates to a polyester resin molded article including the polyester resin composition described above.

Effects of the Invention

According to the present invention, the crystallization speed of polyhydroxyalkanoate is significantly improved so that solidification properties during molding processing such as injection molding or blow molding are improved and the speed of processing is increased. Further, the crystal of polyhydroxyalkanoate is refined so that the mechanical properties of a resulting molded article are stable and are less likely to change with time.

PREFERRED MODE FOR CARRYING OUT THE INVENTION

Hereinbelow, the present invention will be described in detail.

Polyhydroxyalkanoate used in the present invention is at least one selected from microorganism-derived PHAs produced by microorganisms.

The microorganism-derived PHAs produced by microorganisms are aliphatic polyesters comprising a repeating unit represented by the following formula (1): [—CHR—CH₂—CO—O—] (wherein R is an alkyl group represented by $C_nH_{2n+1}$ and n is an integer of 1 or more and 15 or less).

The microorganisms that produce microorganism-derived PHAs are not particularly limited as long as they have the ability to produce PHAs. For example, *Bacillus megaterium* is a poly(3-hydroxybutyrate) (hereinafter, abbreviated as "PHB")—producing microorganism first discovered in 1925, and natural microorganisms such as *Cupriavidus necator* (formerly classified as *Alcaligenes eutrophus*, *Ralstonia eutropha*) and *Alcaligenes latus* are known as other PHB-producing microorganisms. These microorganisms accumulate PHB in their cells.

Further, known microorganisms that produce copolymers of hydroxybutyrate and another hydroxyalkanoate are, for example, *Aeromonas caviae* that produces poly(3-hydroxybutyrate-co-3-hydroxyvalerate) (hereinafter, abbreviated as "PHBV") and poly(3-hydroxybutyrate-co-3-hydroxyhexanoate) (hereinafter, abbreviated as "PHBH") and *Alcaligenes eutrophus* that produces poly(3-hydroxybutyrate-co-4-hydroxybutyrate). Particularly, a preferred PHBH-producing microorganism is, for example, *Alcaligenes eutrophus* AC32, FERM BP-6038 (T. Fukui, Y. Doi, J. Bateriol., 179, p. 4821-4830 (1997)) produced by introducing a PHA synthase gene to improve PHBH productivity. These microorganisms are cultured under appropriate conditions, and the thus obtained cells having PHBH accumulated therein are used. Other than the above microorganisms, genetically-modified microorganisms may also be used which are produced by introducing various PHA synthesis-related genes depending on the desired type of PHA to be produced. In this case, culture conditions including the type of a substrate may be optimized.

The molecular weight of the microorganism-derived PHA used in the present invention is not particularly limited as long as the microorganism-derived PHA virtually sufficiently exhibits its physical properties for the intended use. If the molecular weight is too low, a resulting molded article has low strength. On the other hand, if the molecular weight is too high, processability is reduced and therefore molding is difficult. In consideration of such facts, the weight-average molecular weight of the microorganism-derived PHA used in the present invention is preferably in the range of 50,000 to 3,000,000, more preferably in the range of 100,000 to 1,500,000.

The weight-average molecular weight can be determined as a molecular weight in terms of polystyrene by gel permeation chromatography (GPC) ("Shodex GPC-101" manufactured by Showa Denko K.K.) using a polystyrene gel column ("Shodex K-804" manufactured by Showa Denko K.K.) and chloroform as a mobile phase. In this case, a calibration curve is prepared using polystyrenes having weight-average molecular weights of 31,400, 197,000, 668,000, and 1,920,000. In the GPC, a column appropriate for measuring the above-mentioned molecular weight may be used.

Examples of the microorganism-derived PHA used in the present invention include: PHB (poly(3-hydroxybutyrate), poly-3-hydroxybutyric acid), PHBH (poly(3-hydroxybutyrate-co-3-hydroxyhexanoate), poly(3-hydroxybutyric acid-co-3-hydroxyhexanoic acid)), PHBV (poly(3-hydroxybutyrate-co-3-hydroxyvalerate), poly(3-hydroxybutyric acid-co-3-hydroxyvaleric acid)), P3HB4HB (poly(3-hydroxybutyrate-co-4-hydroxybutyrate), poly(3-hydroxybutyric acid-co-4-hydroxybutyric acid)), poly(3-hydroxybutyrate-co-3-hydroxyoctanoate), and poly(3-hydroxybutyrate-co-3-hydroxyoctadecanoate). Among them, PHB, PHBH, PHBV, and P3HB4HB are easily industrially produced.

As for the average composition ratio of the repeating unit of the microorganism-derived PHA, the composition ratio of poly(3-hydroxybutyrate) is preferably 80 mol % to 99 mol %, more preferably 85 mol % to 97 mol % from the viewpoint of balance between flexibility and strength. If the composition ratio of poly(3-hydroxybutyrate) is less than 80 mol %, stiffness tends to be poor, and if the composition ratio of poly(3-hydroxybutyrate) is more than 99 mol %, flexibility tends to be poor.

The ratio of each monomer as a repeating unit in the PHA copolymer resin can be measured by gas chromatography in the following manner. Two milliliters of a sulfuric acid/methanol mixed solution (15/85 (weight ratio)) and 2 mL of chloroform are added to about 20 mg of dried PHA, and the mixture is hermetically sealed and heated at 100° C. for 140 minutes to obtain a methyl ester of PHA degradation product. After cooled, the methyl ester of PHA degradation product is neutralized by adding 1.5 g of sodium hydrogen carbonate little by little, and the mixture is allowed to stand until the generation of carbon dioxide is stopped. Four milliliters of diisopropyl ether is added to and well mixed with the mixture, and then the monomer unit composition of the PHA degradation product in the supernatant is analyzed by capillary gas chromatography. In this way, the ratio of each monomer in the copolymer resin is determined.

A gas chromatograph and a capillary column used in the capillary gas chromatography are "GC-17A" manufactured by SHIMADZU CORPORATION and "NEUTRA BOND-1" manufactured by GL Sciences Inc. (column length: 25 m, column inner diameter: 0.25 mm, liquid membrane thickness: 0.4 μm), respectively. A carrier gas used is He, the pressure at column inlet is 100 kPa, and the amount of a sample injected is 1 μL. The capillary gas chromatography is performed under conditions where the temperature is increased from an initial temperature of 100° C. to 200° C. at a rate of 8° C./min and further increased from 200° C. to 290° C. at a rate of 30° C./min.

The aliphatic polyester resin composition according to the present invention uses pentaerythritol as a crystal nucleating agent for polyhydroxyalkanoate.

Pentaerythritol is one of polyhydric alcohols represented by the following formula (2) and is an organic compound as white crystal with a melting point of 260.5° C.:

[Chemical Formula 1]

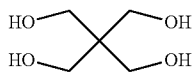

(2)

Pentaerythritol is classified as a sugar alcohol, but is not derived from a natural product and can be synthesized by condensation of acetaldehyde and formaldehyde under basic conditions.

Pentaerythritol used in the present invention is not generally particularly limited as long as it is commonly available, and may be one provided as a reagent or an industrial product. Examples of the reagent include, but are not limited to, those manufactured by Wako Pure Chemical Industries, Ltd., Sigma-Aldrich, Tokyo Chemical Industries Co., Ltd., and Merck. Examples of the industrial product include, but are not limited to, one manufactured by KOEI CHEMICAL CO., LTD., (trade name: Pentarit) and one manufactured by TOYO CHEMICALS CO., LTD.

Some commercially-available reagents and products contain, as impurities, oligomers generated by dehydration condensation of pentaerythritol, such as dipentaerythritol and tripentaerythritol. These oligomers are not effective for the crystallization of polyhydroxyalkanoate, but do not inhibit the crystallization effect of pentaerythritol. Therefore, pentaerythritol used in the present invention may contain such oligomers.

The amount of pentaerythritol used in the present invention is not particularly limited as long as the crystallization of polyhydroxyalkanoate can be promoted. However, the amount of pentaerythritol is preferably 0.05 to 12 parts by weight, more preferably 0.1 to 10 parts by weight, even more preferably 0.5 to 8 parts by weight with respect to 100 parts by weight of polyhydroxyalkanoate. If the amount of pentaerythritol is too small, the effect of pentaerythritol as a crystal nucleating agent cannot be obtained, and if the amount of pentaerythritol is too large, there is a case where viscosity during melt-processing is reduced so that processing is difficult.

The polyester resin composition according to the present invention, containing polyhydroxyalkanoate and pentaerythritol, is superior to only polyhydroxyalkanoate or a resin composition containing polyhydroxyalkanoate and a sugar alcohol compound other than pentaerythritol in that its crystallization during processing stably proceeds under a wider range of processing conditions. Therefore, the polyester resin composition according to the present invention has the following advantages.

Among polyhydroxyalkanoates, when poly(3-hydroxybutyrate-co-3-hydroxyhexanoate) (P(3HB-co-3HH)) or poly(3-hydroxybutyrate-co-3-hydroxyvalerate) (P(3HB-co-3HV)) is crystallized by cooling after heat-melting, the proceeding of crystallization is influenced by the temperature of the resin during melting. That is, the crystallization of the resin tends to be less likely to proceed when the temperature of the resin during melting is higher. For example, in the case of P(3HB-co-3HH), when the temperature of the resin during melting is in the range from the melting point of the resin to about 170° C., the crystallization of the resin during cooling tends to be less likely to proceed when the temperature of the resin during melting is higher. Further, when the temperature of the resin during melting is about 180° C. or higher, the crystallization of the resin during cooling tends to proceed over several hours. Therefore, in order to successfully perform molding processing, the temperature of the resin during melting needs to be controlled to fall within the range from about 170° C. to 180° C. However, the temperature of the resin during melting is not uniform in general molding processing, and therefore it is very difficult to control the temperature of the resin to fall within the above range.

The crystallization of the polyester resin composition according to the present invention, containing polyhydroxyalkanoate and pentaerythritol, stably proceeds over a wide temperature range of the resin during melting. Specifically, even when the temperature of the resin during melting falls within the range from the melting point of the resin to about 190° C., crystallization stably and quickly proceeds, and therefore the resin composition according to the present invention has excellent processing characteristics over a wide range of processing conditions. From the viewpoint of thermal degradation, it is not preferred that melt-processing is performed at a resin melt temperature of 200° C. or higher.

Further, the proceeding of crystallization of polyhydroxyalkanoate depends also on cooling temperature. For example, the crystallization of P(3HB-co-3HH) tends to most proceed when the cooling temperature after heat-melting is 50 to 70° C. If the cooling temperature is lower than 50° C. or higher than 70° C., crystallization tends to be less likely to proceed. In general molding processing, mold temperature correlates with cooling temperature, and therefore needs to be controlled to fall within the above temperature range from 50° C. to 70° C. However, in order to control the mold temperature to be uniform, the structure or shape of a mold needs to be strictly designed, which is very difficult.

The crystallization of the polyester resin composition according to the present invention, containing polyhydroxyalkanoate and pentaerythritol, stably proceeds over a wide cooling temperature range of the resin after melting. Specifically, even when the cooling temperature after heat-melting falls within the range from 20° C. to 80° C., crystallization stably and quickly proceeds, and therefore the resin composition according to the present invention has excellent processing characteristics over a wide range of processing conditions.

The polyester resin composition according to the present invention, containing polyhydroxyalkanoate and pentaerythritol, has the above-described advantages that cannot be achieved by a conventional polyhydroxyalkanoate resin or a conventional resin composition containing a polyhydroxyalkanoate resin and a sugar alcohol compound other than pentaerythritol, and therefore its processing characteristics are excellent in that the temperature of the resin during melting or the cooling temperature of a mold or the like can be set over a wide range.

The crystallization of the polyester resin composition according to the present invention, containing polyhydroxyalkanoate and pentaerythritol, stably and quickly proceeds, and therefore the following characteristics are developed.

For example, in the case of P(3HB-co-3HH), its crystallization does not sufficiently proceed during molding, and therefore gradually proceeds even after molding so that spherocrystals grow, which tends to change the mechanical properties of a molded article with time and gradually make the molded article brittle. However, the polyester resin composition according to the present invention, containing polyhydroxyalkanoate and pentaerythritol, is excellent in the stability of product quality, because many microcrystals are formed just after molding, and therefore spherocrystals are less likely to grow after molding, which suppresses embrittlement of a molded article.

Further, there is a gap in the joint between cavities in a mold for injection molding (e.g., parting line part, insert part, slide core sliding part), and therefore the gap is filled with a molten resin during injection molding so that a molded article has "burr". Polyhydroxyalkanoate is slow in crystallization and has flowability for a long period of time, and therefore burr is likely to be formed and post-processing of a molded article requires a lot of effort. However, the polyester resin composition according to the present invention, containing polyhydroxyalkanoate and pentaerythritol, is preferred from a practical viewpoint because it is quickly crystallized, and therefore burr is less likely to be formed and effort required for post-processing of a molded article can be reduced.

The polyester resin composition according to the present invention can be easily produced by a known melt-kneading machine as long as the melt-kneading machine can achieve heating to a temperature equal to or higher than the melting point of polyhydroxyalkanoate and kneading. For example, a method can be used in which polyhydroxyalkanoate, pentaerythritol, and if necessary, another component are melt-kneaded with an extruder, a roll mill, a Banbury mixer, or the like to form pellets and the pellets are molded or in which a masterbatch containing pentaerythritol in a high concentration is previously prepared and mixed with polyhydroxyalkanoate in a desired ratio, and the mixture is melt-kneaded and molded. Pentaerythritol and polyhydroxyalkanoate may be added to a kneading machine at the same time, or pentaerythritol may be added after polyhydroxyalkanoate is melted.

The thus obtained polyester resin composition according to the present invention is subjected to various processing steps to produce a product. The method of processing may be a known method, and examples thereof include injection molding, blow molding, and extrusion molding. The conditions of processing are not particularly limited as long as the temperature of the resin does not exceed 200° C. at which polyhydroxyalkanoate is thermally degraded.

Polyhydroxyalkanoate is a thermoplastic polyester resin, and resin compositions containing a thermoplastic polyester resin and a pentaerythritol derivative are disclosed as the following prior inventions.

For example, JP-A-2006-117736 discloses a resin composition containing a semi-aromatic thermoplastic polyester resin such as polyethylene terephthalate or polybutylene terephthalate and at least one compound selected from a pentaerythritol long-chain fatty acid ester polymer and a pentaerythritol long-chain fatty acid-dibasic acid composite ester or its polymer. However, the polyester resin composition according to the present invention does not use a pentaerythritol derivative, and is therefore different in composition from this resin composition.

Further, JP-T-9-501450 discloses, as another prior invention, a resin composition containing a biodegradable polyester and at least one plasticizer selected from the group consisting of polypropylene glycol adipate, castor oil, epoxidized soybean oil, epoxidized stearates, high-boiling adipates and sebacates, citrates, and various polyethylene glycol derivatives. Examples of the plasticizer include pentaerythritols and derivatives (the acid-derived radical of the ester typically contains 2 to 10 carbon atoms). The above-mentioned ester derivatives are different from pentaerythritol used in the present invention. Further, the object of this prior invention is to impart ductility to the polyester by adding a substance that can plasticize the polyester resin, especially PHB or PHBV, that is, a substance that can improve the ductility of the polyester, which is different from the object of the present invention achieved by adding pentaerythritol that exerts its effect as a nucleating agent.

Further, Patent Document 1 discloses a method in which a natural product-derived sugar alcohol compound, such as erythritol, galactitol, mannitol, or arabitol, is added as a crystal nucleating agent for polyhydroxyalkanoate. Pentaerythritol is not derived from a natural product, but is structurally classified as a sugar alcohol. Therefore, pentaerythritol is verbally included in the above prior invention, but there is no description or suggestion about pentaerythritol in the detailed description of Patent Document 1. A mixture of erythritol or mannitol as a sugar alcohol described in Patent Document 1 and polyhydroxyalkanoate was melt-kneaded in the same manner as in the present invention with the use of an intermeshed co-rotation twin screw extruder to evaluate crystallization properties. As a result, it was found that erythritol and mannitol were much less effective in improving crystallization properties than pentaerythritol (see Comparative Examples).

JP-A-2000-169546 discloses, as a prior invention, the addition of pentaerythritol to polyhydroxyalkanoate (polylactic acid). However, the object of the prior invention disclosed in this patent document is to obtain a resin composition that has a stable melt viscosity and is suitable for foam molding by reacting the terminal group of polylactic acid, an unreacted isocyanate compound, and a polyhydric alcohol such as pentaerythritol under certain conditions, which is different from the object of the present invention.

Further, the following prior inventions are examples using pentaerythritol.

For example, JP-A-2008-156665 discloses a method for producing a high-molecular-weight aliphatic polyhydroxy carboxylic acid, including the steps of: producing a low-molecular-weight prepolymer by a dehydration polycondensation reaction of an aliphatic hydroxycarboxylic acid, an aliphatic polyhydric alcohol having 3 or more hydroxyl groups such as pentaerythritol, and an aliphatic polybasic acid having 2 or more carboxyl groups or its anhydride or of an aliphatic hydroxycarboxylic acid, an aliphatic polybasic acid having 3 or more carboxyl groups or its anhydride, and an aliphatic polyhydric alcohol having 2 or more hydroxyl groups such as pentaerythritol; crystallizing the prepolymer; and subjecting the crystallized prepolymer to a dehydration polycondensation reaction in a solid state in the presence of an organic sulfonic acid-based compound catalyst. However, the present invention does not include the step of producing a low-molecular-weight prepolymer by a dehydration polycondensation reaction using an aliphatic hydroxycarboxylic acid. Further, the crystallization of the prepolymer in the above prior invention is performed to prevent the fusion of the prepolymer due to high temperature during solid polymerization in the subsequent step, which is entirely different from the crystallization promoting effect of pentaerythritol used in the present invention.

Further, for example, JP-A-2001-192442 discloses a method for crystallizing an aliphatic polyester in a liquid, including crystallizing an aliphatic polyester prepolymer containing an organic sulfonic acid-based compound as a catalyst, having a weight-average molecular weight of 2,000 to 100,000, and containing 50% or more of an aliphatic hydroxycarboxylic acid unit by bringing the aliphatic polyester prepolymer into contact with a liquid containing an acidic compound and not dissolving the aliphatic polyester prepolymer, and also discloses, as a star polymer, the aliphatic polyester prepolymer containing L-lactic acid, pentaerythritol, and succinic acid. However, the present invention does not use a star polymer containing L-lactic acid, pentaerythritol, and succinic acid. Further, the above-described crystallization is a previous step for performing solid polymerization, which is entirely different from the crystallization promoting effect of pentaerythritol used in the present invention.

As described above, the polyester resin composition according to the present invention, containing polyhydroxyalkanoate and pentaerythritol, is entirely different from the above prior inventions previously disclosed, and the crystallization effect described in the present invention is higher.

The polyester resin composition according to the present invention may contain, in addition to the above-described polyhydroxyalkanoate and pentaerythritol used as a crystal nucleating agent, another component such as an antioxidant, an ultraviolet absorber, a colorant such as a dye or a pigment, a plasticizer, a lubricant, an inorganic filler, or an antistatic agent. The amount of such another component to be added is not particularly limited as long as the effect of the polyhydroxyalkanoate or the pentaerythritol is not impaired.

Other examples of such another component include inorganic fibers such as carbon fibers and organic fibers such as human hair and sheep wool. Further, natural fibers can also be used, such as bamboo fibers, pulp fibers, kenaf fibers, analogous other plant alternatives, annual herb plants of the genus Hibiscus in the family Malvaceae, and annual herb plants of the family Tiliaceae. From the viewpoint of reducing carbon dioxide, plant-derived natural fibers are preferred, and kenaf fibers are particularly preferred.

Hereinbelow, a method for producing a polyester resin molded article containing the polyester resin composition according to the present invention will be exemplified.

First, PHA, pentaerythritol, and if necessary, another component are mixed and melt-kneaded using an extruder, a kneader, a Banbury mixer, or a roll to prepare a polyester resin composition. Then, the polyester resin composition is extruded in the form of a strand and cut to obtain particulate polyester resin composition pellets in the form of a cylinder, elliptic cylinder, sphere, cube, or rectangular parallelepiped.

The temperature of the above-described melt-kneading of PHA, pentaerythritol, or the like depends on, for example, the melting point or melt viscosity of PHA used, but the resin temperature of the melt-kneaded product at the outlet of a die is preferably 140 to 200° C., more preferably 150 to 195° C., even more preferably 160 to 190° C. If the resin temperature of the melt-kneaded product is less than 140° C., there is a case where poor dispersion of pentaerythritol occurs, and if the resin temperature of the melt-kneaded product exceeds 200° C., there is a case where PHA is thermally decomposed.

The pellets prepared by the above method are sufficiently dried at 40 to 80° C. to remove moisture, and then the dried pellets can be subjected to molding processing by a known molding processing method to obtain any molded article. Examples of the molding processing method include film molding, sheet molding, injection molding, blow molding, blow molding, fiber spinning, extrusion foaming, and bead foaming.

Examples of a method for producing a molded film include T-die extrusion molding, calender molding, roll molding, and inflation molding. However, the film molding method is not limited thereto. The molding temperature during film molding is preferably 140 to 190° C. Further, the film formed from the polyester resin composition according to the present invention can be subjected to hot forming by heating, vacuum molding, or press molding.

Examples of a method for producing an injection molded article include injection molding methods such as an injection molding method commonly used to mold a thermoplastic resin, a gas-assist molding method, and an injection compression molding method. Further, depending on the purposes, methods other than the above methods may also be used, such as an in-mold forming method, a gas-press molding method, a two-color molding method, a sandwich molding method, PUSH-PULL, and SCORIM. However, the injection molding methods are not limited thereto. The molding temperature during injection molding is preferably 140 to 190° C., and the temperature of a mold is preferably 20 to 80° C., more preferably 30 to 70° C.

The polyester resin composition according to the present invention is excellent in processability, can be processed in a short time, and is suitable for use as a base material for, for example, dishes, agricultural materials, parts for OA equipment, parts for home appliances, members for cars, daily goods, stationery, various molded bottles, extruded sheets, and profile-extruded products.

EXAMPLES

Hereinbelow, the present invention will be specifically described with reference to Examples, but the technical scope of the present invention is not limited by these Examples.

Polyhydroxyalkanoate as raw material A1: one obtained in Production Example 1 was used.

Production Example 1

KNK-005 strain (see U.S. Pat. No. 7,384,766) was used for culture production.

A seed culture medium (pH 6.8) had the following composition: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$.

A preculture medium had the following composition: 1.1 w/v % $Na_2HPO_4 \cdot 12H_2O$, 0.19 w/v % $KH_2PO_4$, 1.29 w/v % $(NH_4)_2SO_4$, 0.1 w/v % $MgSO_4 \cdot 7H_2O$, and 0.5 v/v % trace metal salt solution (obtained by dissolving 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$ in 0.1 N hydrochloric acid). As a carbon source, palm oil was added at one time in a concentration of 10 g/L.

A PHA production medium had the following composition: 0.385 w/v % $Na_2HPO_4 \cdot 12H_2O$, 0.067 w/v % $KH_2PO_4$, 0.291 w/v % $(NH_4)_2SO_4$, 0.1 w/v % $MgSO_4 \cdot 7H_2O$, 0.5 v/v % trace metal salt solution (obtained by dissolving 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$ in 0.1 N hydrochloric acid), and 0.05 w/v % BIOSPUREX200K (defoaming agent: manufactured by Cognis Japan Ltd.).

First, a glycerol stock of KNK-005 strain (50 μL) was inoculated into the seed culture medium (10 mL) and seed-cultured for 24 hours to obtain a seed culture. Then, the seed culture was inoculated at 1.0 v/v % into a 3-liter jar fermenter (MDL-300 manufactured by B. E. MARUBISHI Co., Ltd.) containing 1.8 L of the preculture medium. The jar fermenter was operated under conditions of a culture temperature of 33° C., a stirring speed of 500 rpm, and a ventilation volume of 1.8 L/min to perform preculture for 28 hours while pH was controlled to fall within the range from 6.7 to 6.8 to obtain a preculture. The pH control was performed using a 14% aqueous ammonium hydroxide solution.

Then, the preculture liquid was inoculated at 1.0 v/v % into a 10-liter jar fermenter (MDS-1000 manufactured by B. E. MARUBISHI Co., Ltd.) containing 6 L of the production medium. The jar fermenter was operated under conditions of a culture temperature of 28° C., a stirring speed of 400 rpm, and a ventilation volume of 6.0 L/min, and pH was controlled to fall within the range from 6.7 to 6.8. The pH control was performed using a 14% aqueous ammonium hydroxide solution. As a carbon source, palm oil was used. The culture was performed for 64 hours. After the completion of culture, cells were collected by centrifugation, washed with methanol, and freeze-dried, and the weight of the dried cells was measured.

One hundred mL of chloroform was added to 1 g of the obtained dried cells, and the mixture was stirred at room temperature all day and night to extract PHA in the cells. The cell debris was filtered out, and then the filtrate was concentrated by an evaporator until its total volume was reduced to 30 mL. Then, 90 mL of hexane was gradually added, and the mixture was allowed to stand for 1 hour while being slowly stirred. The precipitated PHA was collected by filtration and then vacuum-dried at 50° C. for 3 hours. In this way, PHA was obtained. The 3HH content of the obtained PHA was measured by gas chromatography in the following manner. Two milliliters of a sulfuric acid/methanol mixed solution (15:85) and 2 mL of chloroform were added to 20 mg of the dried PHA, and the mixture was hermetically sealed and heated at 100° C. for 140 minutes to obtain a methyl ester of PHA degradation product. After cooled, the methyl ester of PHA degradation product was neutralized by adding 1.5 g of sodium hydrogen carbonate little by little, and the mixture was allowed to stand until the generation of carbon dioxide was stopped. The mixture was well mixed with 4 mL of diisopropyl ether and then centrifuged, and then the monomer unit composition of the polyester degradation product in the supernatant was analyzed by capillary gas chromatography. A gas chromatograph and a capillary column used were "GC-17A" manufactured by SHIMADZU CORPORATION and "NEUTRA BOND-1" manufactured by GL Sciences Inc. (column length: 25 m, column inner diameter: 0.25 mm, liquid membrane thickness: 0.4 μm), respectively. A carrier gas used was He, the pressure at column inlet was 100 kPa, and the amount of a sample injected was 1 μL. The capillary gas chromatography was performed under conditions where the temperature was increased from an initial temperature of 100° C. to 200° C. at a rate of 8° C./min and further increased from 200° C. to 290° C. at a rate of 30° C./min. As a result of analysis under the above conditions, the PHA was found to be poly(3-hydroxybutyrate-co-3-hydroxyhexanoate (P(3HB-co-3HH)) represented by the chemical formula (1). The 3-hydroxyhexanoate (3HH) content was 5.6 mol %.

After culture, PHBH was obtained from the culture liquid by a method described in WO 2010/067543. The weight-average molecular weight of PHBH measured by GPC was 600,000.

Polyhydroxyalkanoate as raw material A2: one obtained in Production Example 2 was used.

Production Example 2

Polyester A2, P(3HB-co-3HH), was obtained in the same manner as in Production Example 1 except that KNK-631 strain (see WO 2009/145164) was used instead of KNK-005 strain. The polyester A2 had a weight-average molecular weight Mw of 620,000 and a 3HH content of 7.8 mol %.

Polyhydroxyalkanoate as raw material A3: one obtained in Production Example 3 was used.

Production Example 3

Polyester A3, P(3HB-co-3HH), was obtained in the same manner as in Production Example 1 except that KNK-631 strain was used and palm kernel oil was used as a carbon source. The polyester A3 had a weight-average molecular weight Mw of 650,000 and a 3HH content of 11.4 mol %.

Polyhydroxyalkanoate as raw material A4: PHBV manufactured by Sigma-Aldrich was used. The PHBV had a weight-average molecular weight Mw of 650,000 and a 3-hydroxyvalerate (3HV) content of 5 mol %.

Example 1

(Production of Polyester Resin Composition)

One hundred parts by weight of polyhydroxyalkanoate as the raw material A1 and 0.1 parts by weight of pentaerythritol (manufactured by Wako Pure Chemical Industries, Ltd.) were melt-kneaded using an intermeshed co-rotation twin screw extruder (TEX30 manufactured by The Japan Steel Works, LTD.) at a preset temperature of 120 to 140° C. and a screw rotation speed of 100 rpm to obtain a polyester resin composition containing polyhydroxyalkanoate and pentaerythritol. The temperature of the resin was measured with a K-type thermocouple in direct contact with the molten resin extruded through a die. The polyester resin composition was extruded in the form of a strand through the die and cut into pellets. It is to be noted that the symbol ○ in Tables means that the polyester resin composition could be extruded in the form of a strand and cut into pellets.

(Injection Molding)

The obtained resin composition was molded into bar-shaped specimens in accordance with ASTM D-790 and into dumbbell-shaped specimens in accordance with ASTM D-638 with the use of an injection molding machine (IS-75E manufactured by TOSHIBA MACHINE CO., LTD.) under conditions where the cylinder preset temperature of the molding machine was 120 to 140° C. and the preset temperature of a mold was 50° C. The actual temperature of the resin during molding or the actual temperature of the mold was measured with a K-type thermocouple in contact with the injected resin or the surface of the mold, respectively.
(Demold Time)

The processability of the polyester resin composition according to the present invention was evaluated in terms of demold time. The demold time was defined as the time from when the resin was injected into the mold till when the specimen could be released from the opened mold by ejecting the specimen with an ejection pin without changing its shape. The shorter demold time means that the speed of crystallization is higher and molding processability has been improved.
(Change of Mechanical Properties with Passage of Time)

The change of mechanical properties with passage of time was evaluated in terms of tensile elongation at break. The dumbbell-shaped specimen obtained by injection molding was subjected to tensile measurement at 23° C. in accordance with ASTM D-638 to measure elongation at break. The measurement was performed at 168, 336, 720, and 1440 hours after molding to evaluate the stability of elongation at break. When the measured values are less changed, elongation at break is more stable and better.

Examples 2 to 5

Pellets of a polyester resin composition were prepared in the same manner as in Example 1 except that the blending ratio was changed as shown in Table 1 (blending ratios shown in the following tables are expressed in part(s) by weight), and the demold time of a specimen formed by injection molding and the tensile elongation at break of the specimen were measured. The results are shown in Table 1.

Comparative Example 1

Pellets of a polyester resin composition were prepared in the same manner as in Example 1 except that the blending ratio was changed as shown in Table 1, and the demold time of a specimen formed by injection molding and the tensile elongation at break of the specimen were measured. The results are shown in Table 1.

As shown in Table 1, in the case of Comparative Example 1 (using only the raw material A1), it took 49 seconds to demold the molded article. The tensile elongation at break was 16% at 168 hours after molding, but was reduced to 7%, that is, to half or less than half after a lapse of 1440 hours. On the other hand, it was found that when 0.1 parts by weight or more of pentaerythritol was added, the demold time was reduced to 25 seconds or less, that is, processability was improved, and the tensile elongation at break was hardly changed with time and stable.

Examples 6 and 7

The raw material A2 was used instead of the raw material A1. One hundred parts by weight of the raw material A2 and pentaerythritol in an amount shown in Table 2 were melt-kneaded using an intermeshed co-rotation twin screw extruder (TEX30 manufactured by The Japan Steel Works, LTD.) at a preset temperature of 115 to 135° C. and a screw rotation speed of 100 rpm to prepare pellets of an aliphatic polyester resin composition, and the demold time of a specimen formed by injection molding and the change of tensile elongation at break of the specimen with passage of time were measured in the same manner as in Example 1. The results are shown in Table 2.

Examples 8 and 9

The raw material A3 was used instead of the raw material A1. One hundred parts by weight of the raw material A3 and pentaerythritol in an amount shown in Table 2 were melt-kneaded using an intermeshed co-rotation twin screw extruder (TEX30 manufactured by The Japan Steel Works, LTD.) at a preset temperature of 110 to 130° C. and a screw rotation speed of 100 rpm to prepare pellets of an aliphatic polyester resin composition, and the demold time of a specimen formed by injection molding and the change of tensile elongation at break of the specimen with passage of time were measured in the same manner as in Example 1. The results are shown in Table 2.

Examples 10 to 12

Examples 10 to 12 were performed in the same manner as in Example 1 except that the raw material A4 was used instead of the raw material A1. The results are shown in Table 2.

TABLE 1

|  |  |  | Example |  |  |  |  | Comparative Example |
|---|---|---|---|---|---|---|---|---|
|  |  |  | 1 | 2 | 3 | 4 | 5 | 1 |
| Raw Material | Polyhydroxyalkanoate | Raw Material A1 |  |  | 100 |  |  | 100 |
|  | Pentaerythritol | — | 0.1 | 1 | 2 | 5 | 10 | 0 |
| Melt-Kneading | Kneading Temperature | ° C. | 165 | 164 | 165 | 164 | 163 | — |
|  | Strand, Pelletization | — | ○ | ○ | ○ | ○ | ○ | — |
| Injection Molding | Mold Temperature | ° C. | 51 | 51 | 52 | 52 | 52 | 52 |
|  | Demold Time | seconds | 25 | 20 | 18 | 15 | 15 | 49 |
| Tensile Elongation at Break | 168 Hours after Molding | % | 16 | 16 | 15 | 15 | 13 | 16 |
|  | 336 Hours after Molding |  | 15 | 16 | 15 | 15 | 13 | 10 |
|  | 720 Hours after Molding |  | 15 | 15 | 14 | 14 | 12 | 7 |
|  | 1440 Hours after Molding |  | 14 | 15 | 14 | 14 | 12 | 7 |

Comparative Example 2

Comparative Example 2 was performed in the same manner as in Example 6 except that pentaerythritol was not used. The results are shown in Table 2.

Comparative Example 3

Comparative Example 3 was performed in the same manner as in Example 8 except that pentaerythritol was not used. The results are shown in Table 2.

Comparative Example 4

Comparative Example 4 was performed in the same manner as in Example 10 except that pentaerythritol was not used. The results are shown in Table 2.

TABLE 2

|  |  |  | Example |  |  |  |  |  |  | Comparative Example |  |  |
|---|---|---|---|---|---|---|---|---|---|---|---|---|
|  |  |  | 6 | 7 | 8 | 9 | 10 | 11 | 12 | 2 | 3 | 4 |
| Raw Material | Polyhydroxyalkanoate | Raw Material A2 | 100 | 100 |  |  |  |  |  | 100 |  |  |
|  | Polyhydroxyalkanoate | Raw Material A3 |  |  | 100 | 100 |  |  |  |  | 100 |  |
|  | Polyhydroxyalkanoate | Raw Material A4 |  |  |  |  | 100 | 100 | 100 |  |  | 100 |
|  | Pentaerythritol | — | 1 | 5 | 1 | 5 | 0.1 | 1 | 5 | — | — | — |
| Melt-Kneading | Kneading Temperature | ° C. | 163 | 162 | 161 | 160 | 165 | 165 | 164 | 162 | 160 | 166 |
|  | Strand, Pelletization | — | ○ | ○ | ○ | ○ | ○ | ○ | ○ | ○ | ○ | ○ |
| Injection Molding | Mold Temperature | ° C. | 51 | 51 | 59 | 60 | 50 | 50 | 51 | 52 | 60 | 50 |
|  | Demold Time | seconds | 38 | 26 | 68 | 51 | 21 | 19 | 19 | 60 | 95 | 45 |
| Tensile Elongation at Break | 168 Hours after Molding | % | 86 | 83 | 301 | 282 | 16 | 16 | 15 | 88 | 305 | 16 |
|  | 336 Hours after Molding |  | 86 | 82 | 300 | 275 | 15 | 16 | 15 | 73 | 291 | 10 |
|  | 720 Hours after Molding |  | 84 | 80 | 300 | 276 | 15 | 15 | 14 | 59 | 249 | 7 |
|  | 1440 Hours after Molding |  | 80 | 76 | 273 | 254 | 14 | 15 | 14 | 15 | 18 | 7 |

As can be seen from Table 2, addition of pentaerythritol reduces the demold time that is the time required for demolding, and improves processability. It is apparent that this effect can be obtained irrespective of the copolymer ratio or structure of polyhydroxyalkanoate.

Examples 13 to 15

Comparative Examples 5 to 7

Pellets of a polyester resin composition were prepared in the same manner as in Example 1 except that the blending ratio was changed as shown in Table 3. Then, injection molding was performed in the same manner as in Example 1 except that the mold preset temperature was set at 3 levels of 30° C., 50° C., and 70° C., and the demold time was measured.

Examples 16 to 18

Comparative Examples 8 to 10

Pellets of a polyester resin composition were prepared in the same manner as in Example 6 except that the blending ratio was changed as shown in Table 3. Then, injection molding was performed in the same manner as in Example 6 except that the mold preset temperature was set at 3 levels of 30° C., 50° C., and 70° C., and the demold time was measured.

TABLE 3

|  |  |  | Example |  |  | Comparative Example |  |  | Example |  |  | Comparative Example |  |  |
|---|---|---|---|---|---|---|---|---|---|---|---|---|---|---|
|  |  |  | 13 | 14 | 15 | 5 | 6 | 7 | 16 | 17 | 18 | 8 | 9 | 10 |
| Raw Material | Polyhydroxyalkanoate | Raw Material A1 |  | 100 |  |  |  |  |  |  |  |  |  |  |
|  | Polyhydroxyalkanoate | Raw Material A2 |  |  |  |  |  |  |  | 100 |  |  |  |  |
|  | Pentaerythritol | — | 1 | 1 | 1 | 0 | 0 | 0 | 2 | 2 | 2 | 0 | 0 | 0 |

TABLE 3-continued

|  |  |  | Example | | | Comparative Example | | | Example | | | Comparative Example | | |
|---|---|---|---|---|---|---|---|---|---|---|---|---|---|---|
|  |  |  | 13 | 14 | 15 | 5 | 6 | 7 | 16 | 17 | 18 | 8 | 9 | 10 |
| Melt-Kneading | Kneading Temperature | °C. | 165 | 165 | 165 | — | — | — | 163 | 163 | 163 | — | — | — |
|  | Strand, Pelletization | — | ○ | ○ | ○ | — | — | — | ○ | ○ | ○ | — | — | — |
| Injection Molding | Mold Temperature | °C. | 29 | 51 | 72 | 29 | 52 | 72 | 29 | 51 | 71 | 29 | 52 | 72 |
|  | Demold Time | seconds | 21 | 20 | 20 | 70 | 49 | 55 | 41 | 34 | 38 | 84 | 60 | 68 |

The mold temperature was set at 3 levels within a general range using a water temperature controller commonly and widely used. As can be seen from Table 3, when pentaerythritol was absent, the time required for demolding was increased, and in addition, the demold time varied at different mold temperatures in spite of the fact that the mold temperatures were within such a general range, and therefore demolding properties were unstable. On the other hand, it was found that when pentaerythritol was blended, the demold time was stable and short irrespective of the mold temperature.

Comparative Examples 11 to 14

Pellets of a resin composition were prepared in the same manner as in Example 1 except that erythritol or mannitol was used as a natural product-derived sugar alcohol instead of pentaerythritol, and the demold time of a specimen formed by injection molding and the change of tensile elongation at break of the specimen with passage of time were measured. The results are shown in Table 4.

TABLE 4

|  |  |  | Comparative Example | | | |
|---|---|---|---|---|---|---|
|  |  |  | 11 | 12 | 13 | 14 |
| Raw Material | Polyhydroxyalkanoate | Raw Material A1 | 100 | | | |
|  | Erythritol | — | — | 1 | 5 | |
|  | Mannitol | — | — | | | 1 | 5 |
| Melt-Kneading | Kneading Temperature | °C. | 165 | 164 | 165 | 164 |
|  | Strand, Pelletization | — | ○ | ○ | ○ | ○ |
| Injection Molding | Mold Temperature | °C. | 51 | 52 | 52 | 53 |
|  | Demold Time | seconds | 50 | 51 | 48 | 48 |
| Tensile Elongation at Break | 168 Hours after Molding | % | 15 | 13 | 15 | 14 |
|  | 336 Hours after Molding |  | 10 | 9 | 11 | 10 |
|  | 720 Hours after Molding |  | 6 | 6 | 7 | 7 |
|  | 1440 Hours after Molding |  | 6 | 6 | 7 | 7 |

Erythritol (manufactured by Wako Pure Chemical Industries, Ltd.)
Mannitol (manufactured by Wako Pure Chemical Industries, Ltd.)

Comparative Examples 15 to 20

The demold time was measured at different mold temperatures in the same manner as in Examples 13 to 15 except that erythritol or mannitol was used as a natural product-derived sugar alcohol instead of pentaerythritol. The results are shown in Table 5.

TABLE 5

|  |  |  | Comparative Example | | | | | |
|---|---|---|---|---|---|---|---|---|
|  |  |  | 15 | 16 | 17 | 18 | 19 | 20 |
| Raw Material | Polyhydroxyalkanoate | Raw Material A1 | 100 | | | | | |
|  | Erythritol | — | 1 | 1 | 1 | | | |
|  | Mannitol | — | | | | 1 | 1 | 1 |
| Melt-Kneading | Kneading Temperature | °C. | 165 | 165 | 165 | 165 | 165 | 165 |
|  | Strand, Pelletization | — | ○ | ○ | ○ | ○ | ○ | ○ |
| Injection Molding | Mold Temperature | °C. | 29 | 51 | 72 | 29 | 52 | 72 |
|  | Demold Time | seconds | 69 | 50 | 56 | 67 | 48 | 55 |

Erythritol (manufactured by Wako Pure Chemical Industries, Ltd.)
Mannitol (manufactured by Wako Pure Chemical Industries, Ltd.)

As can be seen from Tables 4 and 5, when a natural product-derived sugar alcohol other than pentaerythritol was used, the demold time and the change of tensile elongation at break with passage of time were not improved, and the demold time was unstable due to a change in the mold temperature.

Comparative Examples 21 to 27

Pellets of a resin composition were prepared in the same manner as in Example 1 except that another additive was used instead of pentaerythritol, and the demold time of a specimen formed by injection molding was measured. The results are shown in Table 6.

Steel Works, LTD., screw diameter: Φ40 mm, die diameter: Φ23 mm) to form a cylindrical bottle (outer diameter: 60 mm (mouth diameter: 25 mm), height: 170 mm (mouth height: 20 mm)). The preset temperatures of cylinder and die of the molding machine were 120 to 140° C., the preset temperature of a mold was 50° C., the screw rotation speed of the molding machine was adjusted to about 10 to 15 rpm so that the length of a parison was 170 mm to 200 mm, and the thickness of body portion of a molded article was adjusted to 0.8 to 1.4 mm. Demold time was measured as the total of the time required to blow air into a parison and the time required to discharge air from a resulting molded article, that is, demold time was defined as the time that elapsed before a blow-molded article could be demolded

TABLE 6

| | | | Comparative Example | | | | | | |
|---|---|---|---|---|---|---|---|---|---|
| | | | 21 | 22 | 23 | 24 | 25 | 26 | 27 |
| Raw Material | Polyhydroxyalkanoate | Raw Material A1 | | | | 100 | | | |
| | Polyvinyl Alcohol | — | 1 | | | | | | |
| | Chitin | — | | 1 | | | | | |
| | Stearic Acid Amide | — | | | 1 | | | | |
| | Indigo | — | | | | 1 | | | |
| | Sorbitol Compound | — | | | | | 1 | | |
| | Triazine | — | | | | | | 1 | |
| | EBS | — | | | | | | | 1 |
| Melt-Kneading | Kneading Temperature | ° C. | 163 | 163 | 164 | 164 | 164 | 165 | 165 |
| | Strand, Pelletization | — | ○ | ○ | ○ | ○ | ○ | ○ | ○ |
| Injection Molding | Mold Temperature | ° C. | 52 | 51 | 51 | 52 | 52 | 52 | 53 |
| | Demold Time | seconds | 50 | 49 | 48 | 51 | 47 | 46 | 51 |

Polyvinyl alcohol (saponification degree: 86 to 90%) (manufactured by Wako Pure Chemical Industries, Ltd.)
Chitin (manufactured by Wako Pure Chemical Industries, Ltd.)
Stearic acid amide (manufactured by Wako Pure Chemical Industries, Ltd.)
Indigo (manufactured by Wako Pure Chemical Industries, Ltd.)
Sorbitol compound (GEL ALL MD manufactured by New Japan Chemical Co., Ltd.)
Triazine (manufactured by Wako Pure Chemical Industries, Ltd.)
EBS (N,N'-ethylenebis(stearic acid)amide manufactured by Wako Pure Chemical Industries, Ltd.)

As can be seen from Table 6, when an additive other than pentaerythritol was used, the demold time was not improved.

As can be seen from the results shown in Tables 4 to 6, addition of natural product-derived erythritol or mannitol that is classified as a sugar alcohol, like pentaerythritol, or addition of PVA or chitosan having a plurality of hydroxyl groups in the molecule did not have the effect of improving the demold time of polyhydroxyalkanoate or the change of tensile elongation at break of polyhydroxyalkanoate with passage of time. Therefore, it is apparent that the effect described in detail in this application is specific to pentaerythritol.

Examples 19 to 22

(Production of Polyester Resin Composition)

A polyester resin composition was obtained in the same manner as in Example 1 except that the blending ratio was changed as shown in Table 7.
(Blow Molding)

The obtained polyester resin composition was molded by a blow molding machine (JB102 manufactured by The Japan from the mold without changing its shape. The shorter demold time means that the speed of crystallization is higher and molding processability is higher.

It is to be noted that in the case of this blow molding machine, a parison of the molten polyester resin composition for the next cycle of blow molding is extruded from the cylinder of the molding machine while blow molding is performed in the mold. That is, when, on one hand, the demold time was as long as more than 60 seconds, on the other hand, the draw-down of a parison extruded from the molding machine for the next cycle of molding was too large, and therefore the next cycle of blow molding could not be performed due to excessive draw-down of the parison.

Comparative Example 28

Pellets of a polyester resin composition were prepared in the same manner as in Example 19 except that the blending ratio was changed as shown in Table 7, and the demold time of a blow-molded article was measured. The results are shown in Table 7.

TABLE 7

|  |  |  | Example | | | | Comparative Example |
|---|---|---|---|---|---|---|---|
|  |  |  | 19 | 20 | 21 | 22 | 28 |
| Raw Material | Polyhydroxyalkanoate | Raw Material A1 | 100 | | | | 100 |
|  | Pentaerythritol | — | 0.1 | 1 | 5 | 10 | 0 |
| Melt-Kneading | Kneading Temperature | °C. | 165 | 164 | 164 | 163 | 165 |
|  | Strand, Pelletization | — | ○ | ○ | ○ | ○ | ○ |
| Blow Molding | Mold Temperature | °C. | 51 | 51 | 52 | 52 | 52 |
|  | Demold Time | seconds | 41 | 27 | 18 | 15 | >60 |

As shown in Table 7, when only the raw material A1 was used as a raw material, the demold time of a blow-molded article exceeded 60 seconds, that is, processability was not improved and continuous molding could not be performed. On the other hand, when 0.1 parts by weight or more of pentaerythritol was added, the demold time was reduced, that is, processability was improved.

Example 23

The raw material A2 was used instead of the raw material A1. One hundred parts by weight of the raw material A2 and 1 part by weight of pentaerythritol were melt-kneaded using an intermeshed co-rotation twin screw extruder (TEX30 manufactured by The Japan Steel Works, LTD.) at a preset temperature of 115 to 135° C. and a screw rotation speed of 100 rpm to obtain an aliphatic polyester resin composition. The obtained pellets were subjected to blow molding in the same manner as in Example 19 to measure the demold time. The results are shown in Table 8.

Example 24

The raw material A3 was used instead of the raw material A1. One hundred parts by weight of the raw material A3 and 1 part by weight of pentaerythritol were melt-kneaded using an intermeshed co-rotation twin screw extruder (TEX30 manufactured by The Japan Steel Works, LTD.) at a preset temperature of 110 to 130° C. and a screw rotation speed of 100 rpm to obtain an aliphatic polyester resin composition. The obtained pellets were subjected to blow molding in the same manner as in Example 19 to measure the demold time. The results are shown in Table 8.

Example 25

Example 25 was performed in the same manner as in Example 19 except that the raw material A4 was used instead of the raw material A1. The results are shown in Table 8.

Comparative Example 29

Comparative Example 29 was performed in the same manner as in Example 23 except that pentaerythritol was not used. The results are shown in Table 8.

Comparative Example 30

Comparative Example 30 was performed in the same manner as in Example 24 except that pentaerythritol was not used. The results are shown in Table 8.

Comparative Example 31

Comparative Example 29 was performed in the same manner as in Example 25 except that pentaerythritol was not used. The results are shown in Table 8.

TABLE 8

|  |  |  | Example | | | Comparative Example | | |
|---|---|---|---|---|---|---|---|---|
|  |  |  | 23 | 24 | 25 | 29 | 30 | 31 |
| Raw Material | Polyhydroxyalkanoate | Raw Material A2 | 100 | | | 100 | | |
|  | Polyhydroxyalkanoate | Raw Material A3 | | 100 | | | 100 | |
|  | Polyhydroxyalkanoate | Raw Material A4 | | | 100 | | | 100 |
|  | Pentaerythritol | — | 1 | 1 | 1 | — | — | — |
| Melt-Kneading | Kneading Temperature | °C. | 163 | 161 | 165 | 162 | 160 | 166 |
|  | Strand, Pelletization | — | ○ | ○ | ○ | ○ | ○ | ○ |
| Blow Molding | Mold Temperature | °C. | 51 | 52 | 52 | 52 | 53 | 53 |
|  | Demold Time | seconds | 30 | 34 | 28 | >60 | >60 | >60 |

As can be seen from Table 8, addition of pentaerythritol reduces the demold time that is the time required to demold a blow-molded article, and improves processability. It is therefore apparent that this effect can be obtained irrespective of the copolymer ratio or structure of polyhydroxyalkanoate.

Comparative Examples 32 to 35

Pellets of a resin composition were prepared in the same manner as in Example 1 except that another additive was used instead of pentaerythritol, and the demold time of a blow-molded article was measured. The results are shown in Table 9.

TABLE 9

|  |  |  | Comparative Example | | | |
|---|---|---|---|---|---|---|
|  |  |  | 32 | 33 | 34 | 35 |
| Raw Material | Polyhydroxyalkanoate | Raw Material A1 | 100 | | | |
|  | Erythritol | — | 1 | 5 | | |
|  | Mannitol | — | | | 1 | |
|  | Polyvinyl Alcohol | — | | | | 1 |
| Melt-Kneading | Kneading Temperature | °C. | 165 | 164 | 165 | 164 |
|  | Strand, Pelletization | — | ○ | ○ | ○ | ○ |
| Injection Molding | Mold Temperature | °C. | 51 | 52 | 52 | 53 |
|  | Demold Time | seconds | >60 | >60 | >60 | >60 |

Erythritol (manufactured by Wako Pure Chemical Industries, Ltd.)
Mannitol (manufactured by Wako Pure Chemical Industries, Ltd.)
Polyvinyl alcohol (saponification degree: 86 to 90%)(manufactured by Wako Pure Chemical Industries, Ltd.)

As can be seen from Table 9, addition of natural product-derived erythritol or mannitol that is classified as a sugar alcohol, like pentaerythritol, or addition of PVA having a plurality of hydroxyl groups in the molecule did not have the effect of improving (reducing) the demold time of polyhydroxyalkanoate. Therefore, it is apparent that the effect described in detail in this application is specific to pentaerythritol.

Polyhydroxyalkanoate as raw material A5: P3HB4HB (EM5400A) manufactured by SHENZHEN ECOMANN BIOTECHNOLOGIES was used.

Examples 26 to 29

Comparative Example 36

(Pellet Productivity)

Pellet productivity was evaluated in the following manner. Polyhydroxyalkanoate and pentaerythritol were blended in a blending ratio shown in Table 10 (blending ratios shown in the following table are expressed in part(s) by weight) and melt-kneaded using the same twin screw extruder as used in Example 1 at a cylinder preset temperature of 120 to 160° C. while the amount of a molten resin extruded from the extruder was increased by gradually increasing the screw rotation speed of the extruder from 100 rpm. The molten resin extruded in the form of a strand through the die of the extruder is crystallized and solidified while passing through a hot bath having a length of 1.5 m and filled with water set at 60° C., and is then cut into pellets by a pelletizer. In order to increase pellet productivity by increasing the amount of the resin to be extruded, the take-up speed of the strand needs to be increased by increasing the screw rotation speed of the extruder. When the screw rotation speed is increased, the temperature of the resin is increased by heat generated by shearing, and the retention time of the strand in the hot bath is shorter as the take-up speed of the strand is higher. When the temperature of the resin is increased, the resin is made difficult to crystallize, and when the retention time of the strand in the hot bath at 60° C. is shorter, the resin does not completely crystallize and remains softened. That is, when the temperature of the resin is increased and the retention time of the strand in the hot bath is shorter, the strand cannot be cut by a pelletizer. Therefore, the maximum take-up speed of the strand at which pelletization could be performed was defined as pellet productivity. The higher take-up speed means that pellet productivity is higher. When the take-up speed was increased, the screw rotation speed of the extruder was also increased so that the diameter (average of long and short diameters) of the strand was adjusted to 3 mm±0.2 mm. Herein, the temperature of the resin was measured with a K-type thermocouple in direct contact with the molten resin extruded through the die of the extruder. The results are shown in Table 10.

(Sheet Productivity)

Sheet productivity was evaluated in the following manner. The obtained pellets as a raw material were subjected to molding using a T-die sheet molding machine (LABO PLASTOMILL manufactured by Toyo Seiki Seisaku-sho. Ltd.) at a die lip thickness of 250 μm, a die lip width of 150 mm, a cylinder preset temperature of 120 to 140° C., a die preset temperature of 140 to 150° C., and a cooling roll preset temperature of 60° C. to obtain a 100 mm-wide sheet. A molten resin extruded in the form of a sheet through a T-die is crystallized by contact with a cooling roll and molded into a 100 μm-thick sheet. When the resin is sufficiently crystallized, the molded sheet is released from the cooling roll and wound up. However, when the take-up speed of the sheet is increased, the time of contact between the sheet and the cooling roll is shortened so that the resin is not crystallized and therefore the sheet is not sufficiently solidified and cannot be released from the roll. Therefore, the maximum take-up speed of the sheet at which the sheet could be released from the roll was defined as sheet productivity. The higher take-up speed means that sheet productivity is higher.

As can be seen from Table 10, the use of pentaerythritol makes it possible to increase the take-up speed of the sheet during molding and therefore to achieve high sheet productivity.

TABLE 10

|  |  |  | Example | | | | Comparative Example |
|---|---|---|---|---|---|---|---|
|  |  |  | 26 | 27 | 28 | 29 | 36 |
| Raw Material | Polyhydroxyalkanoate | Raw Material A5 | 100 | 100 | 100 | 100 | 100 |
|  | Pentaerythritol | — | 0.1 | 0.5 | 1 | 3 | — |
| Pellet | Kneading Temperature | °C. | 168 | 173 | 176 | 180 | 170 |

TABLE 10-continued

|  |  |  | Example | | | | Comparative Example |
| --- | --- | --- | --- | --- | --- | --- | --- |
|  |  |  | 26 | 27 | 28 | 29 | 36 |
| Productivity | Maximum Linear Speed of Strand | m/min | 10 | 15 | 23 | 31 | 4 |
| Sheet Productivity | Take-up Speed of Sheet | m/min | 6 | 9 | 15 | 22 | 2 |

The invention claimed is:

1. An aliphatic polyester resin composition, comprising:
a polyhydroxyalkanoate copolymer; and
a crystal nucleating agent comprising pentaerythritol,
wherein the polyhydroxyalkanoate copolymer includes a repeating unit of 3-hydroxybutyrate at a composition ratio of from 80 mol % to 99 mol %.

2. The aliphatic polyester resin composition according to claim 1, wherein the pentaerythritol is included in an amount of from 0.05 to 12 parts by weight with respect to 100 parts by weight of the polyhydroxyalkanoate copolymer.

3. The aliphatic polyester resin composition according to claim 1, wherein the polyhydroxyalkanoate copolymer comprises a repeating unit represented by general formula (1):

[—CHR—CH$_2$—CO—O—]  (1)

wherein R is an alkyl group represented by C$_n$H$_{2n+1}$ and n is an integer of 1 or more and 15 or less.

4. The aliphatic polyester resin composition according to claim 1, wherein the polyhydroxyalkanoate copolymer is at least one selected from the group consisting of poly(3-hydroxybutyric acid-co-3-hydroxyvaleric acid), poly(3-hydroxybutyric acid-co-3-hydroxyvaleric acid-co-3-hydroxyhexanoic acid), poly(3-hydroxybutyric acid-co-3-hydroxyhexanoic acid), and poly(3-hydroxybutyric acid-co-4-hydroxybutyric acid).

5. A polyester resin molded article obtained by a process comprising molding the aliphatic polyester resin composition according to claim 1.

6. The aliphatic polyester resin composition according to claim 1, wherein the polyhydroxyalkanoate copolymer is poly(3-hydroxybutyric acid-co-3-hydroxyhexanoic acid).

7. The aliphatic polyester resin composition according to claim 1, wherein the polyhydroxyalkanoate copolymer is poly(3-hydroxybutyric acid-co-3-hydroxyvaleric acid).

8. The aliphatic polyester resin composition according to claim 1, wherein the pentaerythritol is included in an amount of from 0.1 to 10 parts by weight with respect to 100 parts by weight of the polyhydroxyalkanoate copolymer.

9. The aliphatic polyester resin composition according to claim 6, wherein the pentaerythritol is included in an amount of from 0.1 to 10 parts by weight with respect to 100 parts by weight of the poly(3-hydroxybutyric acid-co-3-hydroxyhexanoic acid).

10. The aliphatic polyester resin composition according to claim 7, wherein the pentaerythritol is included in an amount of from 0.1 to 10 parts by weight with respect to 100 parts by weight of the poly(3-hydroxybutyric acid-co-3-hydroxyvaleric acid).

11. The aliphatic polyester resin composition according to claim 1, wherein the pentaerythritol is included in an amount of from 0.5 to 8 parts by weight with respect to 100 parts by weight of the polyhydroxyalkanoate copolymer.

12. The aliphatic polyester resin composition according to claim 6, wherein the pentaerythritol is included in an amount of from 0.5 to 8 parts by weight with respect to 100 parts by weight of the poly(3-hydroxybutyric acid-co-3-hydroxyhexanoic acid).

13. The aliphatic polyester resin composition according to claim 7, wherein the pentaerythritol is included in an amount of from 0.5 to 8 parts by weight with respect to 100 parts by weight of the poly(3-hydroxybutyric acid-co-3-hydroxyvaleric acid).

14. A method of producing an aliphatic polyester resin composition, comprising:
culturing at least one of *Bacillus megaterium*, *Cupriavidus necator*, *Alcaligenes latus* and *Alcaligenes eutrophus* AC32 such that a polyhydroxyalkanoate copolymer is produced; and
mixing the polyhydroxyalkanoate copolymer and a crystal nucleating agent comprising pentaerythritol,
wherein the pentaerythritol is mixed in an amount of from 0.1 to 10 parts by weight with respect to 100 parts by weight of the polyhydroxyalkanoate copolymer, and
the polyhydroxyalkanoate copolymer includes a repeating unit of 3-hydroxybutyrate at a composition ratio of from 80 mol % to 99 mol %.

15. The method of claim 14, wherein the culturing comprises culturing *Alcaligenes eutrophus* AC32.

16. The method of claim 15, wherein the pentaerythritol is mixed in an amount of from 0.5 to 8 parts by weight with respect to 100 parts by weight of the polyhydroxyalkanoate copolymer.

17. The method of claim 14, wherein the composition ratio is 85 mol % to 97 mol %.

18. The method of claim 14, wherein the polyhydroxyalkanoate copolymer has a weight-average molecular weight in a range of from 50,000 to 3,000,000.

19. The method of claim 14, wherein the polyhydroxyalkanoate copolymer has a weight-average molecular weight in a range of from 100,000 to 1,500,000.

20. The aliphatic polyester resin composition of claim 1, wherein the composition ratio is 85 mol % to 97 mol %.

* * * * *